United States Patent
Wang et al.

(10) Patent No.: US 12,103,136 B2
(45) Date of Patent: Oct. 1, 2024

(54) METHOD AND SYSTEM FOR DRILLING CERAMIC

(71) Applicant: RAYTHEON TECHNOLOGIES CORPORATION, Farmington, CT (US)

(72) Inventors: Zhigang Wang, South Windsor, CT (US); Paul F. Croteau, Columbia, CT (US); Gajawalli V. Srinivasan, South Windsor, CT (US); John D. Riehl, Hebron, CT (US); Robin H. Fernandez, Litchfield, CT (US)

(73) Assignee: RTX CORPORATION, Farmington, CT (US)

( * ) Notice: Subject to any disclaimer, the term of this patent is extended or adjusted under 35 U.S.C. 154(b) by 196 days.

(21) Appl. No.: 17/406,536

(22) Filed: Aug. 19, 2021

(65) Prior Publication Data

US 2023/0056508 A1 Feb. 23, 2023

(51) Int. Cl.
*B24C 1/04* (2006.01)
*B24C 7/00* (2006.01)

(52) U.S. Cl.
CPC ............ *B24C 1/045* (2013.01); *B24C 7/0007* (2013.01)

(58) Field of Classification Search
CPC ... B24C 7/0007; B24C 7/0015; B24C 7/0023; B24C 7/0084; B24C 5/02; B24C 5/04; B24C 1/04; B24C 1/045
See application file for complete search history.

(56) References Cited

U.S. PATENT DOCUMENTS

| 3,435,560 A | 4/1969 | Andersen |
| 4,375,740 A * | 3/1983 | Brown ................... B24C 3/065 |
| | | 451/88 |

(Continued)

FOREIGN PATENT DOCUMENTS

| DE | 102014204881 | 9/2015 |
| EP | 3460191 | 3/2019 |

(Continued)

OTHER PUBLICATIONS

European Search Report for European Patent Application No. 22188828.2 mailed Jan. 20, 2023.

*Primary Examiner* — Laura C Guidotti
*Assistant Examiner* — Sidney D Full
(74) *Attorney, Agent, or Firm* — Carlson, Gaskey & Olds, P.C.

(57) ABSTRACT

A method of machining includes mounting a component in a drilling machine. The component has a target region where the hole is to be drilled. The component and a jet head are situated relative to each other in a drilling arrangement in which the target region is at a first position that is vertically equal to or vertically above a second position at which the jet head is located. A liquid stream is jetted from the jet head and contains either abrasive particles or a laser beam. The stream impinges the target region, and the abrasive particles or the laser beam cause removal of material from the component to form the hole. The liquid stream rebounds off of the component as back-splash. The drilling arrangement causes gravitational draining of the back-splash from the target region to reduce interference between the back-splash and the liquid stream.

10 Claims, 5 Drawing Sheets

(56) References Cited

U.S. PATENT DOCUMENTS

| | | | | |
|---|---|---|---|---|
| 4,651,476 | A | * | 3/1987 | Marx .................... B24C 1/045 451/75 |
| 5,372,540 | A | * | 12/1994 | Burch .................... B26F 3/004 83/53 |
| 5,860,849 | A | * | 1/1999 | Miller .................... B24C 1/045 451/99 |
| 7,186,167 | B2 | | 3/2007 | Joslin |
| 8,262,802 | B2 | | 9/2012 | Garry et al. |
| 9,370,871 | B2 | | 6/2016 | Hashish et al. |
| 9,446,501 | B2 | | 9/2016 | Obrachta et al. |
| 11,679,454 | B2 | * | 6/2023 | Sanders .................... C21D 7/06 239/589 |
| 2009/0272245 | A1 | * | 11/2009 | Voice .................... B24C 1/045 83/875 |
| 2014/0024295 | A1 | * | 1/2014 | Hashish .................... B26F 3/008 451/87 |
| 2014/0109939 | A1 | * | 4/2014 | David .................... B08B 3/02 134/36 |
| 2015/0184517 | A1 | | 7/2015 | Smith et al. |
| 2021/0154799 | A1 | * | 5/2021 | Dean, Jr. .................... B24C 1/045 |
| 2021/0205913 | A1 | * | 7/2021 | Nadler .................... B23K 37/0258 |

FOREIGN PATENT DOCUMENTS

| | | |
|---|---|---|
| EP | 3521704 | 8/2019 |
| GB | 2389330 | 12/2003 |
| WO | 2006100798 | 9/2006 |

\* cited by examiner

METHOD AND SYSTEM FOR DRILLING CERAMIC

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. It has been a challenge, however, to develop an efficient way to machine features, such as cooling holes, into CMCs. One methodology is to drill deep, small-diameter holes in the CMCs. However, grinding, laser, ultrasonic and abrasive waterjet machining can have issues of poor surface integrity, high tool wear, and low productivity.

SUMMARY

A method of machining a hole in a component according to an example of the present disclosure includes mounting a component in a drilling machine. The component has a target region at which a hole is to be drilled, and the component and a jet head are situated relative to each other in a drilling arrangement in which the target region is at a first position that is vertically equal to or vertically above a second position at which the jet head is located. A liquid stream is jetted from the jet head. The liquid stream contains either abrasive particles or a laser beam. The liquid stream impinges the target region and the abrasive particles or the laser beam cause removal of material from the component at the target region to form the hole in the component. The liquid stream rebounds off of the component as back-splash liquid, and the drilling arrangement causes gravitational draining of the back-splash liquid from the target region to reduce interference between the back-splash liquid and the liquid stream.

A further embodiment of any of the foregoing embodiments includes, relative to the component, moving the jet head such that the liquid stream scans across the target region.

A further embodiment of any of the foregoing embodiments includes, relative to the component, moving the jet head such that the liquid stream scans the target region in a spiral pattern.

A further embodiment of any of the foregoing embodiments includes providing a computerized 3-dimensional model of the hole that is to be drilled, dividing the model into a series of successive 2-dimensional layers, and relative to the component moving the jet head such that the liquid stream scans the target region layer-by-layer of the series of successive 2-dimensional layers such that the abrasive particles or the laser beam causes removal of the material layer-by-layer.

In a further embodiment of any of the foregoing embodiments, initial layers of the series of successive 2-dimensional layers successively decrease in area such that the hole includes a tapered section.

In a further embodiment of any of the foregoing embodiments, after the initial layers, subsequent layers of the series of successive 2-dimensional layers are successively equal in area such that the hole includes a uniform section.

A further embodiment of any of the foregoing embodiments includes, relative to the component, moving the jet head such that the liquid stream scans the target region in a series of spiral patterns layer-by-layer of the series of successive 2-dimensional layers.

In a further embodiment of any of the foregoing embodiments, the liquid stream is continuous through the series of spiral patterns.

In a further embodiment of any of the foregoing embodiments, the spiral patterns alternate between inside-out movement of the jet head and outside-in movement of the jet head.

In a further embodiment of any of the foregoing embodiments, the first position is vertically above the second position.

A system for machining a hole in a component according to an example of the present disclosure includes a drilling machine that has a holder and a jet head. The holder is operable to mount a component that has a target region at which a hole is to be drilled. The holder and the jet head are situated or capable of being situated relative to each other in a drilling arrangement in which the target region is at a first position that is vertically equal to or vertically above a second position at which the jet head is located. The drilling machine is operable to jet a liquid stream from the jet head. The liquid stream contains either abrasive particles or a laser beam the liquid stream to impinge the target region such that the abrasive particles or the laser beam causes removal of material from the component at the target region to form the hole in the component. The liquid stream rebounds off of the component as back-splash liquid, and the drilling arrangement causes gravitational draining of the back-splash liquid from the target region to reduce interference between the back-splash liquid and the liquid stream.

In a further embodiment of any of the foregoing embodiments, the drilling machine includes an electronic controller that is configured, relative to the component, to move the jet head such that the liquid stream scans across the target region.

In a further embodiment of any of the foregoing embodiments, the controller is configured to move the jet head such that the liquid stream scans the target region in a spiral pattern.

In a further embodiment of any of the foregoing embodiments, the controller includes a computerized 3-dimensional model of the hole that is to be drilled, the model is divided into a series of successive 2-dimensional layers, and the controller is configured to move the jet head such that the liquid stream scans the target region layer-by-layer of the series of successive 2-dimensional layers such that the abrasive particles or the laser beam causes removal of the material layer-by-layer.

In a further embodiment of any of the foregoing embodiments, initial layers of the series of successive 2-dimensional layers successively decrease in area such that the hole includes a tapered section.

In a further embodiment of any of the foregoing embodiments, after the initial layers, subsequent layers of the series of successive 2-dimensional layers are successively equal in area such that the hole includes a uniform section.

In a further embodiment of any of the foregoing embodiments, the controller is configured to move the jet head such that the liquid stream scans the target region in a series of spiral patterns layer-by-layer of the series of successive 2-dimensional layers.

In a further embodiment of any of the foregoing embodiments, controller is operable to continuously maintain the liquid stream throughout the series of spiral patterns.

In a further embodiment of any of the foregoing embodiments, the controller is configured to alternate the spiral patterns between inside-out movement of the jet head and outside-in movement of the jet head.

In a further embodiment of any of the foregoing embodiments, the first position is vertically above the second position.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
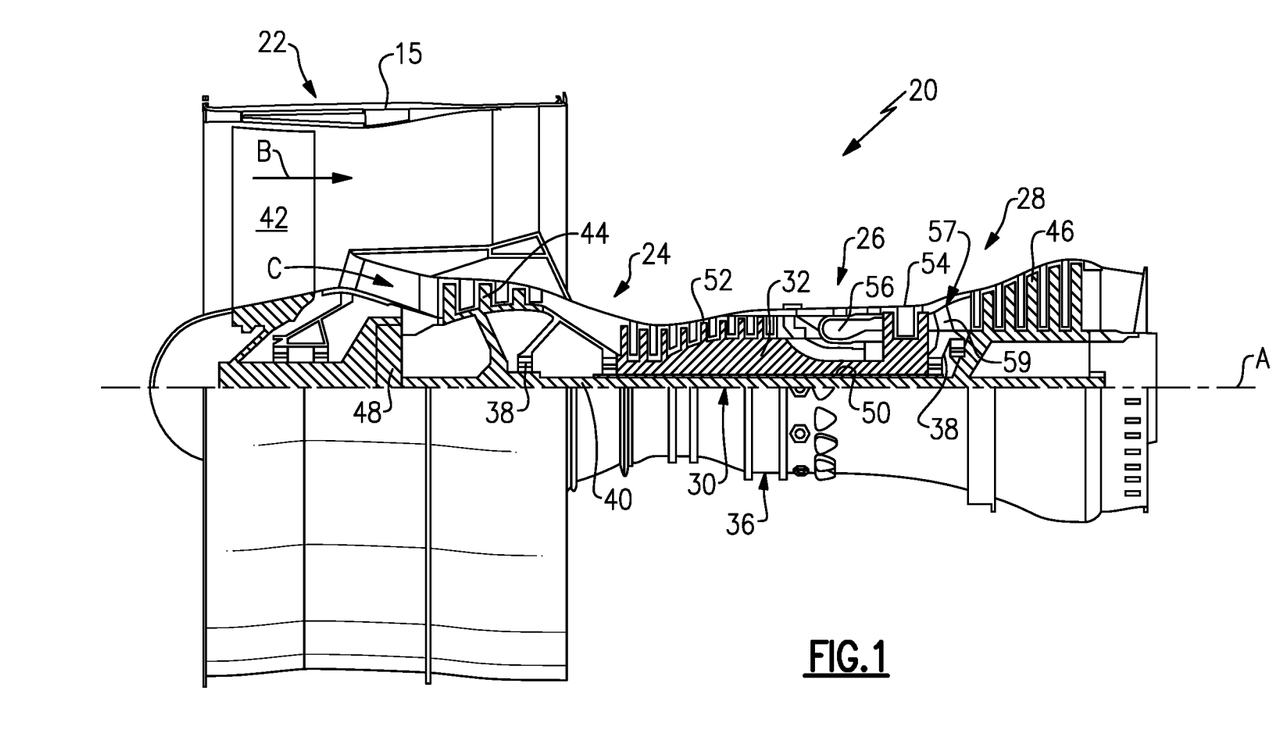
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram °R)/(518.7 °R)]0.5. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Components in the engine 20, such as but not limited to, turbine blades, turbine vanes, blade outer air seals, and combustor panels, include cooling holes. The cooling holes are used to emit relatively cool air to provide film cooling over the surface of the component. The cooling holes are most typically formed by a drilling operation. However, when the component is made of ceramic, such as monolithic ceramic or ceramic matrix composite (CMC), efficient drilling is challenging because ceramics are extremely hard and brittle. The drilling of relatively deep, small-diameter holes is especially challenging. For instance, both waterjet guided laser and abrasive waterjet use high-speed waterjets to either guide the laser or accelerate abrasive particles to remove material, respectively. After impinging the component, the waterjet rebounds as back-splash. The back-splash is turbulent and can interfere with the incoming waterjet, thereby disrupting the coherency of the waterjet and hindering efficient material removal. As will be described, the disclosed system and methodology facilitates removal of back-splash and more efficient drilling.

Figure 2:
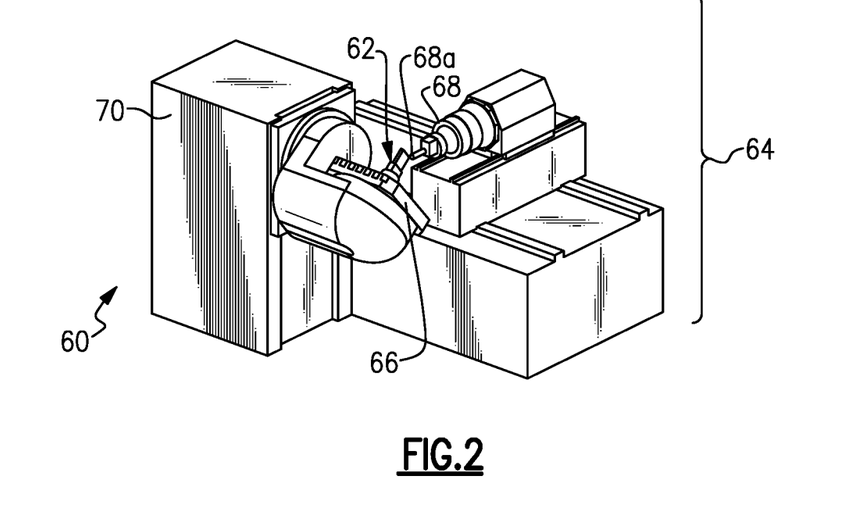
FIG. 2 illustrates a system for drilling a hole in a component.

FIG. 2 illustrates an example system 60 for drilling holes in a component 62. The component 62 is made of ceramic (monolithic, CMC, or combination) but is not otherwise limited. As examples, the component 62 may be a turbine blade, turbine vane, blade outer air seal, or combustor panel. The system 60 includes a drilling machine 64 that has a holder (generally at 66), a jet head 68, and an electronic controller module 70. The holder 66 serves to secure the component 62 in a known position relative to the jet head 68. The holder 66 may include one or more clamps, fasteners, clips, fixtures, adhesive, or the like that are used to mount (i.e., secure) the component 62 in the holder 66. The jet head 68 includes a nozzle 68a for jetting a working liquid toward the component 62. Most typically, the working liquid is water, but other liquids may also be used. The term "jetting" or variations thereof are used herein as reference to a forced discharge of a stream of the liquid from a nozzle. The jet head 68 is of known construction for either liquid guided laser drilling or abrasive liquid jet drilling.

The electronic controller module 70 is operably connected with the holder 66 and the jet head 68. In that regard, the electronic controller module 70 includes hardware, such as one or more microprocessors, software, or both that is configured to control the operation of the holder 66 and jet head 68 and carry out the functions described in this disclosure. In the illustrated example, the electronic controller module 70 is self-contained in the drilling machine 64, although it is also contemplated that portions of the electronic controller module 70 may be in one or more separate electronic devices, such as computers, tablets, or the like. One or both of the holder 66 and the jet head 68 are moveable, the movement of which is controlled by the electronic controller module 70. In this regard, the holder 66 may be moved, the jet head 68 may be moved, or both the holder 66 and the jet head 68 may be moved, all of which serve to move the component 62 relative to the jet head 68.

Figure 3:
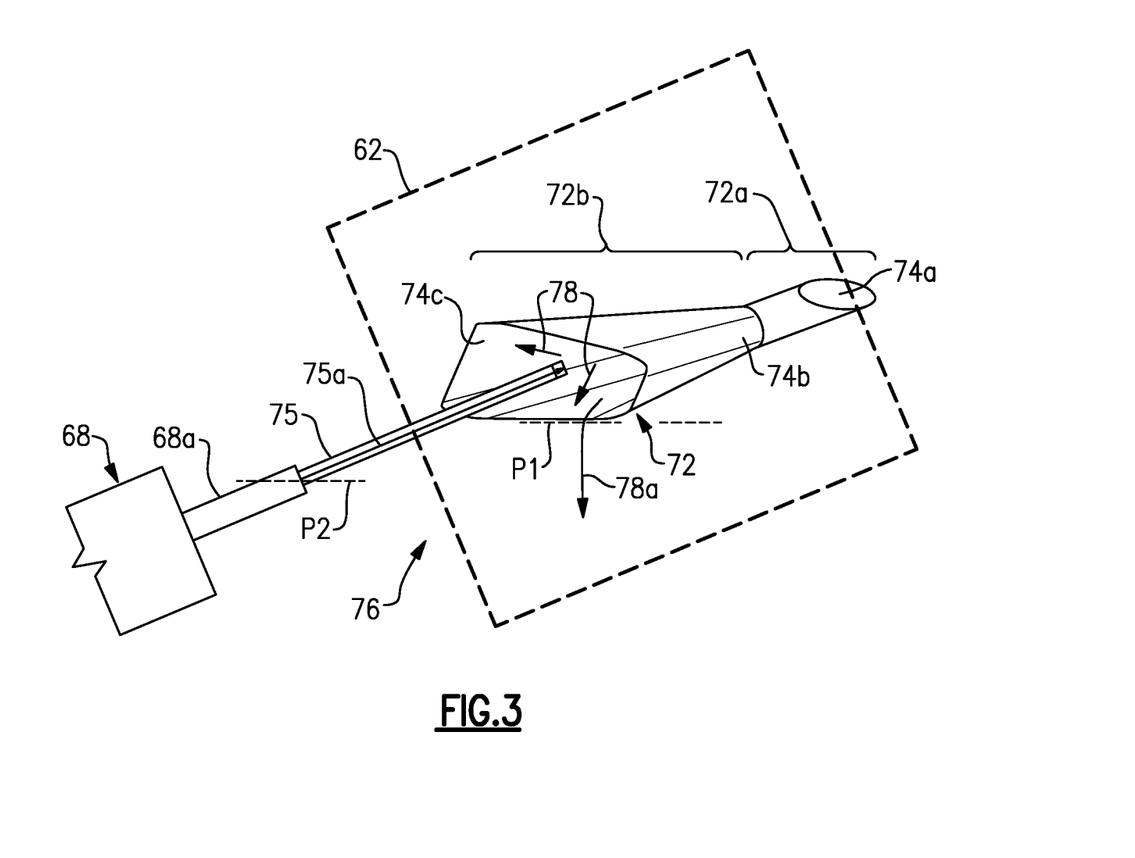
FIG. 3 illustrates a portion of a jet head and a component that is to be drilled.

FIG. 3 illustrates a portion of the jet head 68 and the component 62. The component 62 has a target region 72 at which a hole is to be drilled. For instance, the target region 72 is the region of the component 62 that contains material that will be removed to form the hole, i.e., a 3-dimensional projection of the hole. The type of hole is not particularly limited, except that the hole is deep relative to its maximum width. In the illustrated example, the hole to be drilled is a metering diffusion hole that has a uniform section 72a and a tapered (diffusion) section 72b. The uniform section 72a has an inlet end 74a and an outlet end 74b. The outlet end 74b is also the inlet end of the tapered section 72b. From the inlet end 74b the tapered section diverges to an outlet end 74c. The inlet end 74a will typically open to a core cavity or cooling passage in the component 62, and the outlet end 74c opens at the exterior, core gas path surface of the component 62.

The component 62 and the jet head 68 are situated relative to each other in a drilling arrangement 76. The drilling arrangement 76 refers to the setup of the relative positioning of the component 62 and the jet head 68 in the drilling machine 64. In the drilling arrangement 76 the target region 72 is at a first position P1 that is vertically equal to or vertically above a second position P2 at which the jet head 68 is located. The terms "above" and "below" refer to vertical positions relative to horizontal reference planes. Thus, relative to a reference plane at P2, the plane at P1 is vertically equal to or vertically above the plane at P2. The position P1 is taken at the lowest vertical location of the target region 72, and the position P2 is taken at the centerline exit point of the nozzle 68a of the jet head 68.

The jet head 68 and nozzle 68a are operable (by the electronic controller module 70) to jet a liquid stream 75. In the drilling arrangement 76 the nozzle 68a is aimed at the target region 72 such that the liquid stream 75 impinges upon the target region 72 to remove material from the component 62. As generally indicated at 75a, the liquid stream 75 contains either abrasive particles or a laser beam. As examples, the abrasive particles may be, but are not limited to, silicon carbide, boron carbide or diamond and may suspended in a slurry with a carrier such as water or oil. As the liquid stream 75 impinges the target region 72, the abrasive particles or the laser beam cause removal of material from the component 62 to form the hole in the component 62. The component 62 may be provided with a guard in the interior cavity that the hole opens into. The guard blocks the laser or abrasive particles once the drilling breaks through to the interior cavity. During drilling the liquid stream 75 rebounds off of the component 62 as back-splash liquid, represented at 78. The drilling arrangement 76 causes gravitational draining 78a of the back-splash liquid 78 from the target region 72. That is, since the plane at P1 is vertically equal to or vertically above the plane at P2, the back-splash liquid tends to flow out of the hole as it is being drilled. This clears the back-splash liquid 78 from the hole to thereby reduce interference between the back-splash liquid 78 and the liquid stream 75. The liquid stream 75 can thus remove material at a higher rate than if there was interference, reducing drilling time. While some gravitational flow of the back-splash liquid 78 can occur at a vertically equal arrangement, increased gravitational flow of the back-splash liquid 78 is expected when P1 is vertically above the plane at P2. This is due to the downward-sloped orientation of the hole as it is being drilled.

Figure 4:
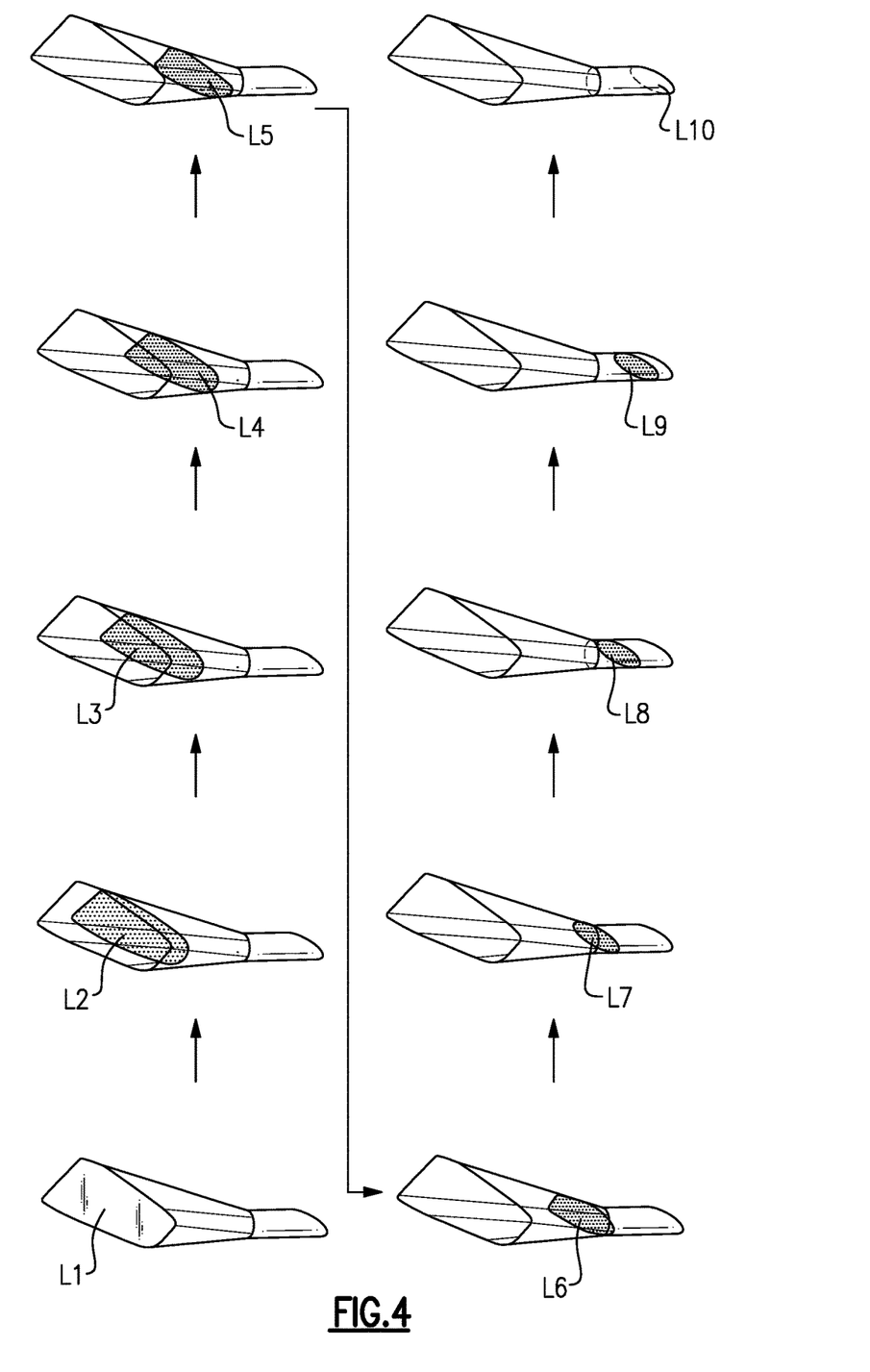
FIG. 4 illustrates 2-dimensional layers of a model of a hole.

In the drilling operation, the electronic controller module 70 moves the jet head 68 relative to the component 62 such that the liquid stream 75 scans across the target region 72. For instance, the jet head 68 is moved such that the liquid stream 75 scans the target region 72 in a spiral pattern. An example, spiral pattern 80 is shown in FIG. 4, in which the line represents the path of the liquid stream 75 from an inner point 80a to an outer point 80b, or vice versa. For instance, the offset, or distance from one ring of the spiral pattern 80 to the next, may be set as a percentage (e.g., 95%, 90%, 85%, etc.) of the diameter of the liquid stream 75.

As an example, the electronic controller module 70 is provided with a computerized 3-dimensional model of the hole that is to be drilled. For instance, the model is a program file for the tool path of the hole to be drilled. The model may be created outside of the electronic controller module 70 and then uploaded to the module 70 for operation of the drilling machine 64. The model is divided into a series of successive 2-dimensional layers, represented in FIG. 4 as layers L1 through L10. The jet head 68 is moved such that the liquid stream 75 scans the target region 72 layer-by-layer through the series of successive 2-dimensional layers L1-L10 such that the abrasive particles or the laser beam causes removal of the material layer-by-layer. For instance, to form the tapered section 72b of the hole, the initial layers L1 through L6 successively decrease in area. The subsequent layers L7 through L10 are successively equal in area to form the uniform section 72a.

To remove the material layer-by-layer, the jet head 68 is moved such that the liquid stream 75 scans the target region 72 in a series of spiral patterns layer-by-layer L1 through L10. For example, the spiral pattern 80 in FIG. 5 may correspond to layer L3, the spiral pattern 82 in FIG. 6 may correspond to layer L4, and the spiral pattern 84 in FIG. 7 may correspond to layers L7 through L10.

Figure 5:
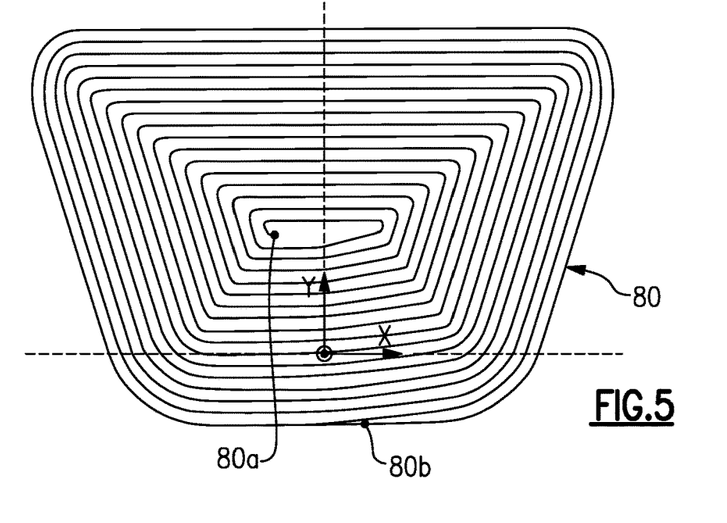
FIG. 5 illustrates a spiral pattern of a layer of the model of the hole.
Figure 6:
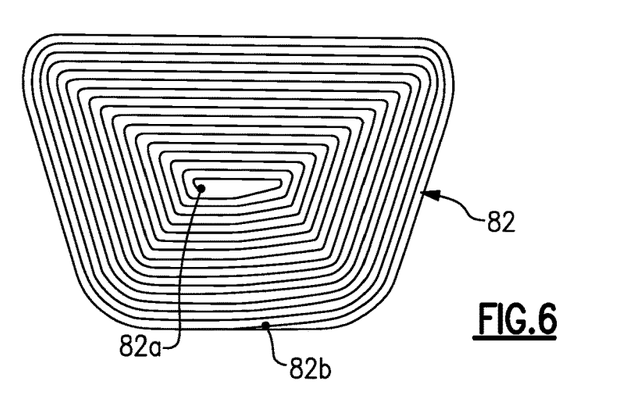
FIG. 6 illustrates another spiral pattern of a layer.
Figure 7:
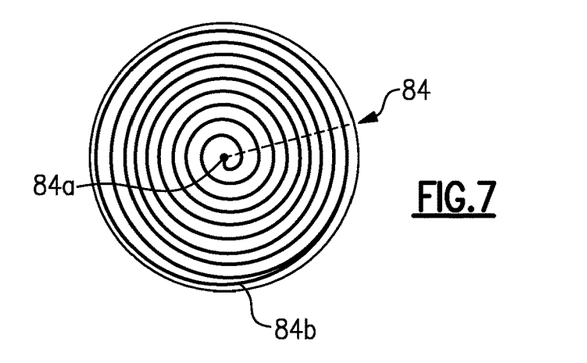
FIG. 7 illustrates a spiral pattern of a layer of a uniform section of the hole.

To facilitate maintaining efficiency, the electronic controller module 70 also keeps the liquid stream 75 running continuously through the series of spiral patterns layer-by-layer. For example, the jet head 68 is moved along the spiral pattern 80 from point 80a to point 80b (i.e. an inside-out movement) for layer L3. The point 80b then serves as an outer point 82b of the next spiral pattern 82 for layer L4 and is the starting point for the jet head 68 to move along the spiral pattern 82 to the inner point 82a (i.e. an outside-in movement) for layer L4. Similarly, the jet head 68 may be moved inside-out along the spiral pattern 84 from point 84a to point 84b for layer L7 and then from 84b to 84a for layer L8. By use of the 2-dimensional layers from the model and alternating between inside-out movement of the jet head 68 and outside-in movement of the jet head 68 from layer-to-layer, the liquid stream 75 can be continuously run through the series of spiral patterns over layers L1 to L10. If the end point of one spiral pattern did not coincide with the location of the starting point of the next spiral pattern, then the liquid stream 75 would have to be stopped while it moves between those points, adding time to the drilling operation. The disclosed continuous approach thus avoids stoppages that would otherwise increase the overall duration of the drilling operation. The continuous movement of the jet head 68 also facilitates avoidance of interference back-splash 78.

Figure 8:
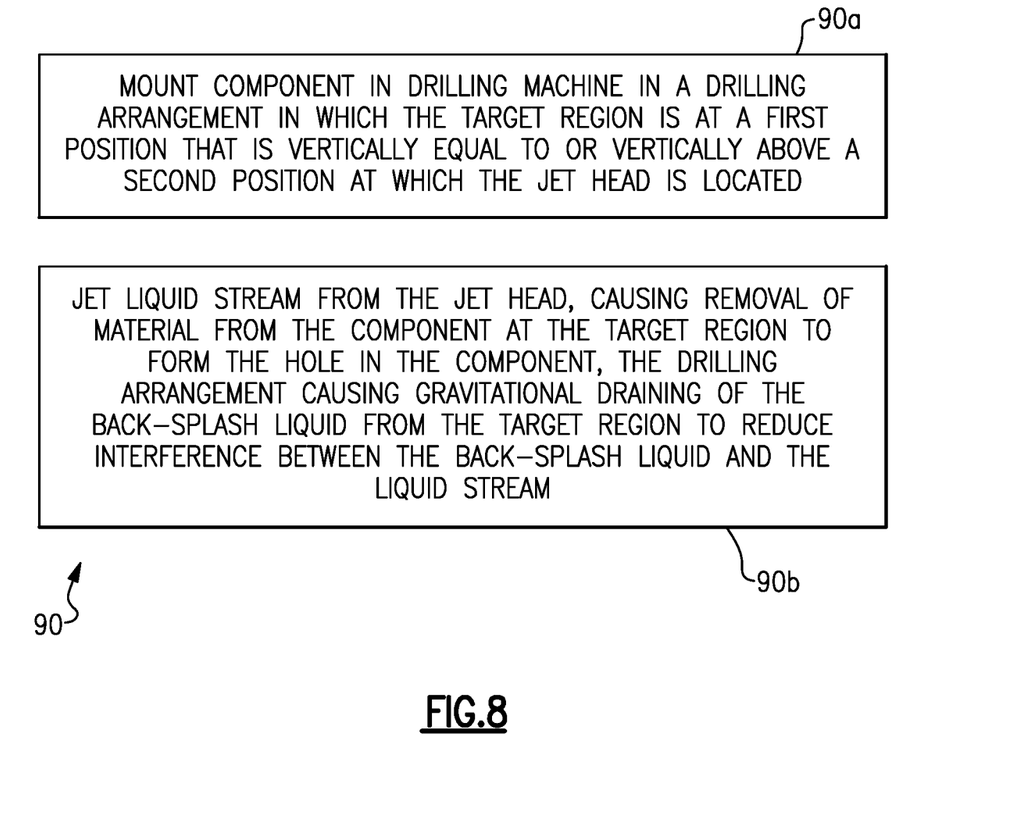
FIG. 8 illustrates a method of drilling a hole in a component.

The system 60 is also representative of a method 90 of machining the hole in the component 62, as shown in FIG. 8. The method includes steps 90a and 90b. Step 90a includes mounting the component 62 in the drilling machine 64. For example, the component 62 is clamped or fastened in the holder 66. The component 62 is mounted in the disclosed drilling arrangement 76 with regard to positions P1 and P2 discussed above. In some cases, the relative positions of the jet head 68 and/or the holder 66 may be adjusted via the electronic controller module 70 in order to achieve the desired drilling arrangement 76. The electronic controller module 70 then jets the liquid stream 75 from the jet head 68. The liquid stream 75 impinges the target region 72 and the abrasive particles or the laser beam (75a) causes removal of material from the component 62 at the target region 72 to form the hole in the component 62. As discussed, the drilling arrangement 76 causes gravitational draining of the back-splash liquid 78a from the target region 72 to reduce interference between the back-splash liquid 78a and the liquid stream 75.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of machining a hole in a component, the method comprising:
mounting the component in a drilling machine, the component having a target region at which the hole is to be drilled, and the component and a jet head being situated relative to each other in a drilling arrangement in which the target region is at a first position that is vertically equal to or vertically above a second position at which the jet head is located;
jetting a liquid stream from the jet head, the liquid stream containing either abrasive particles or a laser beam, the liquid stream impinging the target region, the abrasive particles or the laser beam causing removal of material from the component at the target region to form the hole in the component, the liquid stream rebounding off of the component as back-splash liquid, and the drilling arrangement causing gravitational draining of the back-splash liquid from the hole to reduce interference between the back-splash liquid in the hole and the liquid stream; and
providing a computerized 3-dimensional model of the hole that is to be drilled, dividing the model into a series of successive 2-dimensional layers, and relative to the component moving the jet head such that the liquid stream moves across the target region layer-by-layer of the series of successive 2-dimensional layers and such that the liquid stream moves across the target region in a series of spiral patterns layer-by-layer of the series of successive 2-dimensional layers such that the abrasive particles or the laser beam causes removal of the material layer-by-layer, wherein the spiral patterns alternate layer-by-layer between inside-out movement of the jet head and outside-in movement of the jet head.

2. The method as recited in claim 1, wherein initial layers of the series of successive 2-dimensional layers successively decrease in area such that the hole includes a tapered section.

3. The method as recited in claim 2, wherein after the initial layers, subsequent layers of the series of successive 2-dimensional layers are successively equal in area such that the hole includes a uniform section.

4. The method as recited in claim 1, wherein the liquid stream is continuous through the series of spiral patterns.

5. The method as recited in claim 1, wherein the first position is vertically above the second position.

6. A system for machining a hole in a component, the system comprising:

a drilling machine having a holder and a jet head, the holder operable to mount the component that has a target region at which the hole is to be drilled, the holder and the jet head situated or capable of being situated relative to each other in a drilling arrangement in which the target region is at a first position that is vertically equal to or vertically above a second position at which the jet head is located;

the drilling machine operable to jet a liquid stream from the jet head, the liquid stream containing either abrasive particles or a laser beam, the liquid stream to impinge the target region such that the abrasive particles or the laser beam causes removal of material from the component at the target region to form the hole in the component, where the liquid stream rebounds off of the component as back-splash liquid, and the drilling arrangement causes gravitational draining of the back-splash liquid from the hole to reduce interference between the back-splash liquid in the hole and the liquid stream; and the drilling machine includes an electronic controller that is configured, relative to the component, to move the jet head such that the liquid stream moves across the target region, the electronic controller includes a computerized 3-dimensional model of the hole that is to be drilled, to divide the model into a series of successive 2-dimensional layers, and the controller is configured to move the jet head such that the liquid stream moves across the target region layer-by-layer of the series of successive 2-dimensional layers and such that the liquid stream moves across the target region in a series of spiral patterns layer-by-layer of the series of successive 2-dimensional layers such that the abrasive particles or the laser beam causes removal of the material layer-by-layer, and the controller is configured to alternate the spiral patterns layer-by-layer between inside-out movement of the jet head and outside-in movement of the jet head.

7. The system as recited in claim 6, wherein initial layers of the series of successive 2-dimensional layers successively decrease in area such that the hole includes a tapered section.

8. The system as recited in claim 7, wherein after the initial layers, subsequent layers of the series of successive 2-dimensional layers are successively equal in area such that the hole includes a uniform section.

9. The system as recited in claim 6, wherein the controller is operable to continuously maintain the liquid stream throughout the series of spiral patterns.

10. The system as recited in claim 6, wherein the first position is vertically above the second position.

* * * * *